(12) United States Patent
Thompson et al.

(10) Patent No.: US 8,511,293 B2
(45) Date of Patent: Aug. 20, 2013

(54) MODULAR OUTDOOR KITCHEN

(75) Inventors: Arthur Charles Thompson, Hickory, NC (US); Bruce Douglas Spangrud, Las Vegas, NV (US)

(73) Assignee: Mediumrare, Inc., San Antonio, TX (US)

( * ) Notice: Subject to any disclaimer, the term of this patent is extended or adjusted under 35 U.S.C. 154(b) by 0 days.

(21) Appl. No.: 10/438,262

(22) Filed: May 14, 2003

(65) Prior Publication Data
US 2004/0065313 A1    Apr. 8, 2004

Related U.S. Application Data

(63) Continuation-in-part of application No. 29/163,760, filed on Jul. 11, 2002, now Pat. No. Des. 475,552.

(51) Int. Cl.
*F24B 3/00* (2006.01)
*F24B 1/28* (2006.01)
*F24B 1/198* (2006.01)

(52) U.S. Cl.
USPC .......... 126/29; 126/25 R; 126/9 R; 126/39 B; 126/30; 312/107; 312/107.5; 312/111; 99/339; 99/357; 99/449

(58) Field of Classification Search
CPC ............ F24B 1/28; F24B 1/195; F24B 1/198; F24B 1/00; F24B 3/00
USPC .................. 126/37 R, 8, 40, 39 B, 214 B, 50, 126/111, 107.5, 25 R, 9 R, 9 B, 275 R, 29, 126/30; 312/107, 198, 237, 236, 223; 52/36.1, 52/36.3; 99/339, 357, 449; D07/332
IPC .............................. F24B 3/00, 1/28, 1/198, 1/00
See application file for complete search history.

(56) References Cited

U.S. PATENT DOCUMENTS

| | | | | | |
|---|---|---|---|---|---|
| 967,447 | A | * | 8/1910 | Schmidt | 126/9 R |
| 1,066,595 | A | * | 7/1913 | Freeman | 126/29 |
| 1,084,509 | A | * | 1/1914 | Wamble | 126/29 |
| 1,276,995 | A | * | 8/1918 | Thomas, Jr. | 126/29 |

(Continued)

FOREIGN PATENT DOCUMENTS

| | | | | |
|---|---|---|---|---|
| EP | 0 331 647 | A | * | 9/1989 |
| GB | 2129543 | A | * | 5/1984 |

OTHER PUBLICATIONS

Website www.acutabove.net/html/outdoor_kitchens.html dated Feb. 18, 2003.*
Website www.randtservices.com/outdoor.html dated May 3, 2001.*

(Continued)

*Primary Examiner* — Steven B. McAllister
*Assistant Examiner* — Daniel E Namay
(74) *Attorney, Agent, or Firm* — Weide & Miller, Ltd.

(57) ABSTRACT

A modular outdoor kitchen comprises a plurality of weather-resistant outdoor kitchen modules. Each module comprises a frame having a plurality of outer faces. The modules are releasably connected together in mating arrangement. A plurality of weather-resistant fascia panels are provided on at least a portion of the pluralities of outer faces of the frames. Each fascia panel includes at least one exterior surface that simulates the appearance of an outdoor building material. The modular outdoor kitchen substantially has the appearance of a built-in outdoor kitchen that is substantially constructed of the outdoor building material when the plurality of outdoor kitchen modules are connected together.

16 Claims, 8 Drawing Sheets

(56) References Cited

U.S. PATENT DOCUMENTS

| | | | | |
|---|---|---|---|---|
| 1,364,371 A * | 1/1921 | Higham | | 126/29 |
| 1,454,385 A * | 5/1923 | Higham | | 126/29 |
| 1,919,898 A * | 7/1933 | Martin | | 126/38 |
| 2,361,247 A * | 10/1944 | Swenson | | 126/222 |
| 2,521,765 A * | 9/1950 | White | | 312/107 |
| 2,576,409 A * | 11/1951 | Michaelis et al. | | 312/107 |
| D168,142 S | 11/1952 | Castle | | D6/397 |
| 2,621,586 A * | 12/1952 | Roney | | 99/339 |
| D170,839 S | 11/1953 | Trout et al. | | D6/447 |
| 2,897,811 A * | 8/1959 | Authier | | 126/9 B |
| 2,900,045 A | 8/1959 | Conklin et al. | | 186/1 |
| 2,907,316 A * | 10/1959 | Windust | | 126/9 B |
| 2,944,862 A * | 7/1960 | Heil | | 312/237 |
| 3,199,503 A * | 8/1965 | Hanson | | 126/25 R |
| 3,289,664 A * | 12/1966 | Hewitt | | 126/37 R |
| D222,870 S | 1/1972 | Bearinger | | D7/332 |
| 3,698,780 A * | 10/1972 | Collins et al. | | 312/245 |
| 3,746,416 A * | 7/1973 | Sasnett et al. | | 312/198 |
| 3,746,417 A | 7/1973 | Sasnett | | 312/198 |
| D230,004 S | 1/1974 | Moltere | | D7/334 |
| 3,848,375 A | 11/1974 | White | | 52/36 |
| 3,892,452 A | 7/1975 | Williams et al. | | 312/330 |
| 3,915,529 A * | 10/1975 | Bernier | | 312/237 |
| 3,926,486 A | 12/1975 | Sasnett | | 312/198 |
| 3,971,605 A * | 7/1976 | Sasnett | | 312/198 |
| 4,008,931 A | 2/1977 | Kennedy, Jr. et al. | | 312/111 |
| D254,468 S | 3/1980 | Cox | | D7/108 |
| 4,205,652 A * | 6/1980 | Psarris | | 126/9 R |
| D260,723 S | 9/1981 | Schifter et al. | | 7/334 |
| D262,086 S | 12/1981 | Miller | | D7/107 |
| 4,362,093 A * | 12/1982 | Griscom | | 99/339 |
| D286,958 S | 12/1986 | Gualtieri | | D6/432 |
| 4,702,224 A * | 10/1987 | Griffith | | 126/8 |
| 4,706,642 A * | 11/1987 | Sims et al. | | 126/9 R |
| 4,714,304 A | 12/1987 | Sisk et al. | | 312/214 |
| D294,896 S | 3/1988 | Weiss | | D6/432 |
| D296,850 S * | 7/1988 | Pamio | | D6/397 |
| 4,826,263 A * | 5/1989 | Speraw | | 312/111 |
| 4,877,011 A * | 10/1989 | Willice | | 126/25 R |
| 4,919,109 A * | 4/1990 | Riley | | 126/9 R |
| D314,913 S | 2/1991 | Ferbrache | | D9/430 |
| 5,076,258 A * | 12/1991 | Gongwer | | 126/25 R |
| 5,163,536 A * | 11/1992 | Tuhro et al. | | 186/44 |
| 5,184,886 A | 2/1993 | Handley et al. | | 312/107 |
| 5,343,851 A * | 9/1994 | Cusson | | 126/4 |
| 5,364,672 A * | 11/1994 | Schultze-Kraft | | 428/15 |
| D372,247 S | 7/1996 | Beaumont | | D14/240 |
| 5,588,724 A | 12/1996 | Emery | | 312/236 |
| 5,720,547 A | 2/1998 | Baird | | 312/107 |
| 5,765,239 A | 6/1998 | Moses | | 5/2.1 |
| D410,818 S | 6/1999 | Best | | D7/403 |
| 5,913,270 A | 6/1999 | Price | | 108/101 |
| 5,934,183 A | 8/1999 | Schlosser et al. | | 99/385 |
| 5,941,622 A | 8/1999 | Davidson et al. | | 312/400 |
| 5,943,828 A * | 8/1999 | Samborn et al. | | 52/36.1 |
| 5,951,127 A | 9/1999 | Smith | | 312/205 |
| 6,024,085 A * | 2/2000 | Hodge et al. | | 126/500 |
| 6,138,558 A | 10/2000 | Harrington | | 100/102 |
| 6,189,526 B1 * | 2/2001 | Bland | | 126/8 |
| 6,329,595 B1 * | 12/2001 | Roberts | | 174/53 |
| 6,343,545 B1 | 2/2002 | Patterson et al. | | 99/423 |
| 6,354,288 B1 * | 3/2002 | McDonald | | 126/519 |
| D468,555 S | 1/2003 | Romaen et al. | | D6/440 |
| D475,552 S * | 6/2003 | Thompson | | D6/432 |
| 6,615,818 B1 * | 9/2003 | Jimka et al. | | 126/8 |
| 6,739,330 B1 * | 5/2004 | Ross | | 126/41 R |
| 7,201,458 B2 * | 4/2007 | DeMars | | 312/140.2 |
| 7,497,531 B2 * | 3/2009 | Gross | | 312/107 |
| 2002/0033172 A1 * | 3/2002 | Ruiz | | 126/25 R |
| 2003/0227240 A1 * | 12/2003 | Khosropour et al. | | 312/319.5 |
| 2005/0246969 A1 | 11/2005 | Jarski | | 52/79.14 |
| 2007/0131221 A1 * | 6/2007 | Lightbourne | | 126/275 R |

OTHER PUBLICATIONS

Swedish Patent #SE-8103206-A.*
Optional Granite Grill Island Kit, Kenmore Elite Grill, Sears brochure, Apr. 2003.

* cited by examiner

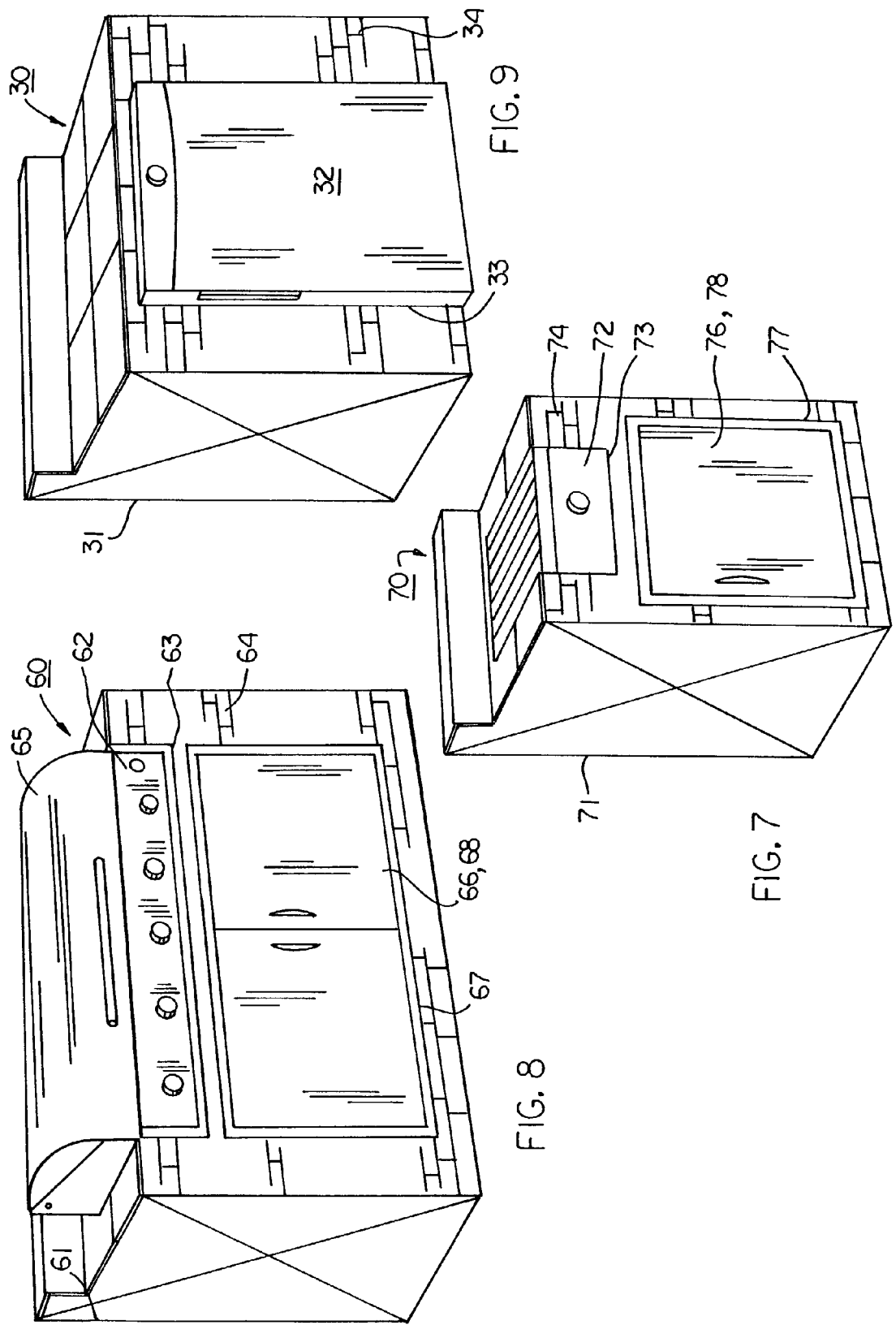

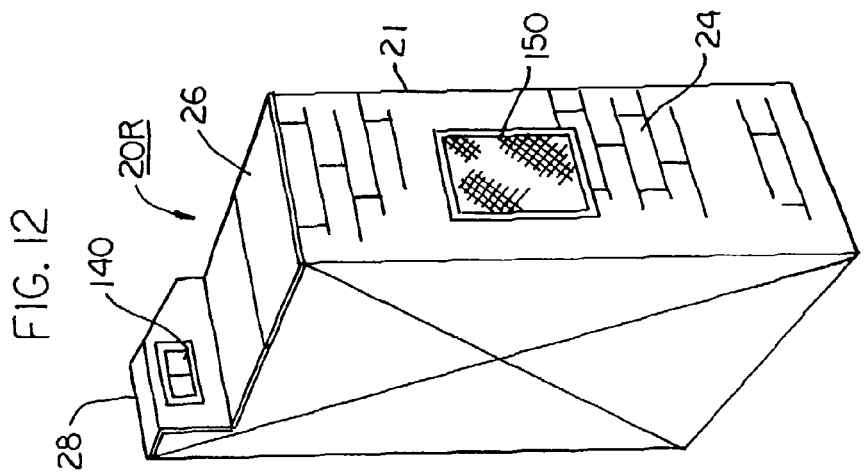
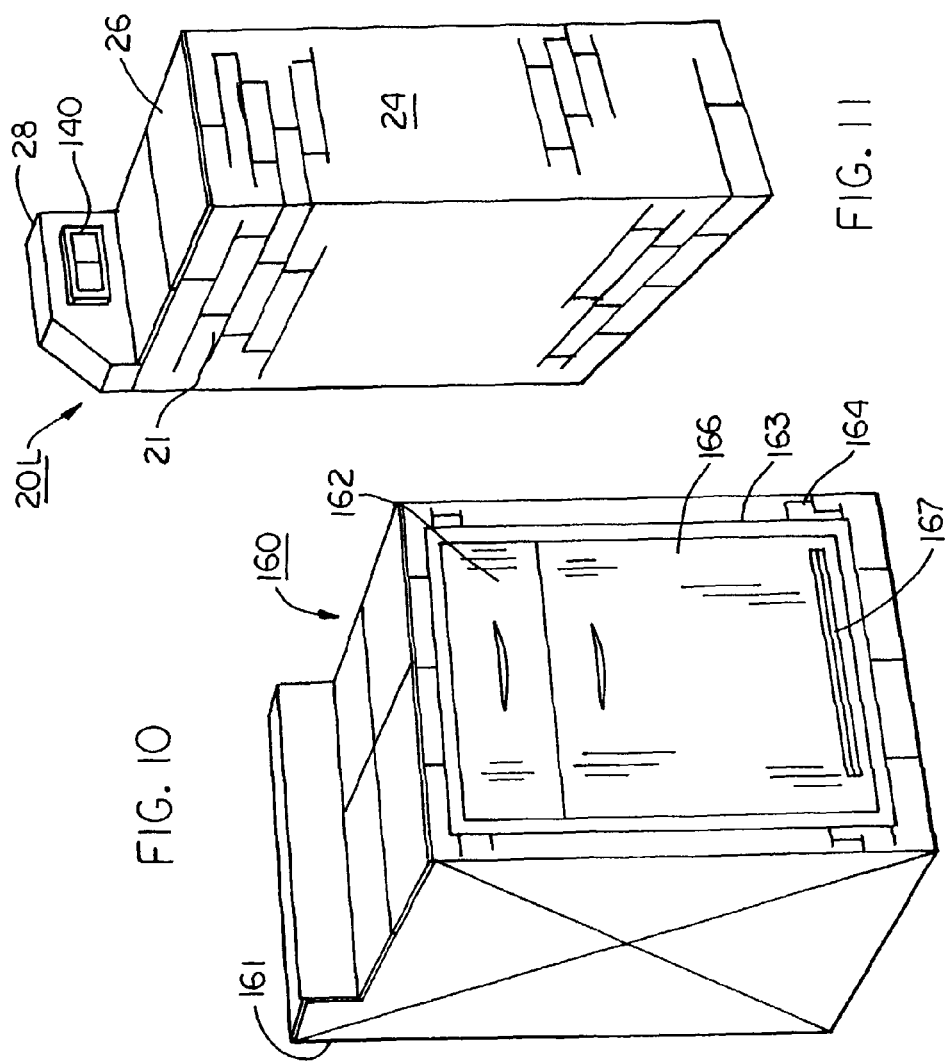

MODULAR OUTDOOR KITCHEN

RELATED APPLICATIONS

This application is a continuation-in-part of Design Application Ser. No. 29/163,760 filed Jul. 11, 2002 now U.S. Pat. No. D. 475,552.

FIELD OF THE INVENTION

The invention relates to outdoor food preparation equipment, and more specifically, to a modular outdoor kitchen for outdoor patios, terraces, and the like.

BACKGROUND

Outdoor recreation and entertainment often includes outdoor cooking. Portable outdoor gas and charcoal grills for cooking foods outdoors are well known. In addition, where affordable and practical, permanently constructed barbeque pits are also used to prepare foods on outdoor patios or terraces. Unfortunately, while such outdoor cooking equipment and facilities are effective for cooking foods, they typically do not include suitable facilities for many other types of food preparation or for the storage of foods, utensils, and cooking supplies. For example, it is often necessary to first prepare food in an indoor kitchen before cooking the food outdoors. Many foods require maintenance at refrigerated temperatures before cooking. Such foods typically must be stored in an indoor refrigerator or an ice chest. In addition, foods that are to be prepared by cooking methods other than grilling (such as on a stovetop) must typically be prepared indoors.

Outdoor kitchens are known that enable persons to prepare meals outdoors without the need for associated indoor food preparation activities. Such outdoor kitchens often include an outdoor structure or "island" that is permanently constructed of outdoor building materials such as brick, stone, stucco, tile, wood, or the like. These outdoor kitchens may include food preparation surfaces, gas burners and associated cooking surfaces, refrigerators for cold food storage, drawers and cabinets for the storage of utensils and other articles, and the like. Unfortunately, such permanently constructed outdoor kitchens are expensive and difficult and time-consuming to construct. In addition, it is impractical to move or alter a permanently constructed outdoor kitchen to suit changing needs or preferences.

Therefore, there is a need for an outdoor kitchen that is less costly and more practical than permanently constructed outdoor kitchens. There is a need for an outdoor kitchen that is substantially portable. There also is a need for an outdoor kitchen that can be rearranged or reconfigured to suit changing needs or preferences. It is also desirable for such an outdoor kitchen to have the appearance of a permanently constructed outdoor kitchen.

SUMMARY OF THE INVENTION

The invention includes a modular outdoor kitchen. The modular outdoor kitchen includes a plurality of outdoor kitchen modules. Each module comprises a frame having a plurality of outer faces. The modules releasably connect together in mating arrangement. A plurality of weather-resistant fascia panels is on at least a portion of the pluralities of outer faces of the frames. Each fascia panel includes at least one exterior surface that simulates the appearance of an outdoor building material. The modular outdoor kitchen substantially has the appearance of a built-in outdoor kitchen that is substantially constructed of the outdoor building material when the plurality of outdoor kitchen modules are connected together.

The invention also includes a module for an outdoor kitchen. The module includes an inner frame having a plurality of outer faces. At least one weather-resistant fascia panel including an exterior surface is attached to at least a portion of the outer faces of the frame. The term "weather-resistant" as used herein means being capable of substantially withstanding rain, moisture, heat, cold, and direct sunlight for a substantial period of time without substantial degradation. The exterior surface of the fascia panel simulates the appearance of an outdoor building material. The module has the appearance of at least a portion of a built-in outdoor kitchen that is substantially constructed of the outdoor building material.

The invention further includes a method of providing a weather-resistant outdoor kitchen. The method includes making available a plurality of interconnectable outdoor kitchen modules. Each module includes at least one weather-resistant fascia panel on an outer surface of the module. Each fascia panel includes an exterior surface that simulates the appearance of an outdoor building material. The method further includes providing at least two outdoor kitchen modules from the plurality of outdoor kitchen modules, and arranging for the transportation the at least two outdoor kitchen modules to an outdoor kitchen site. The at least two outdoor kitchen modules are capable of being assembled together to form an outdoor kitchen that substantially has the appearance of an outdoor kitchen constructed of the outdoor building material.

BRIEF DESCRIPTION OF THE DRAWINGS

FIG. 7 is a perspective view of an outdoor kitchen module having a single gas burner;

FIG. 8 is a perspective view of an outdoor kitchen module having multiple gas burners;

FIG. 9 is a perspective view of an outdoor kitchen module having a refrigerator;

FIG. 10 is a perspective view of an outdoor kitchen module having a large lower drawer;

FIG. 11 is a perspective view of a left end outdoor kitchen module;

FIG. 12 is a perspective view of a right end outdoor kitchen module;

DETAILED DESCRIPTION

Figure 1:
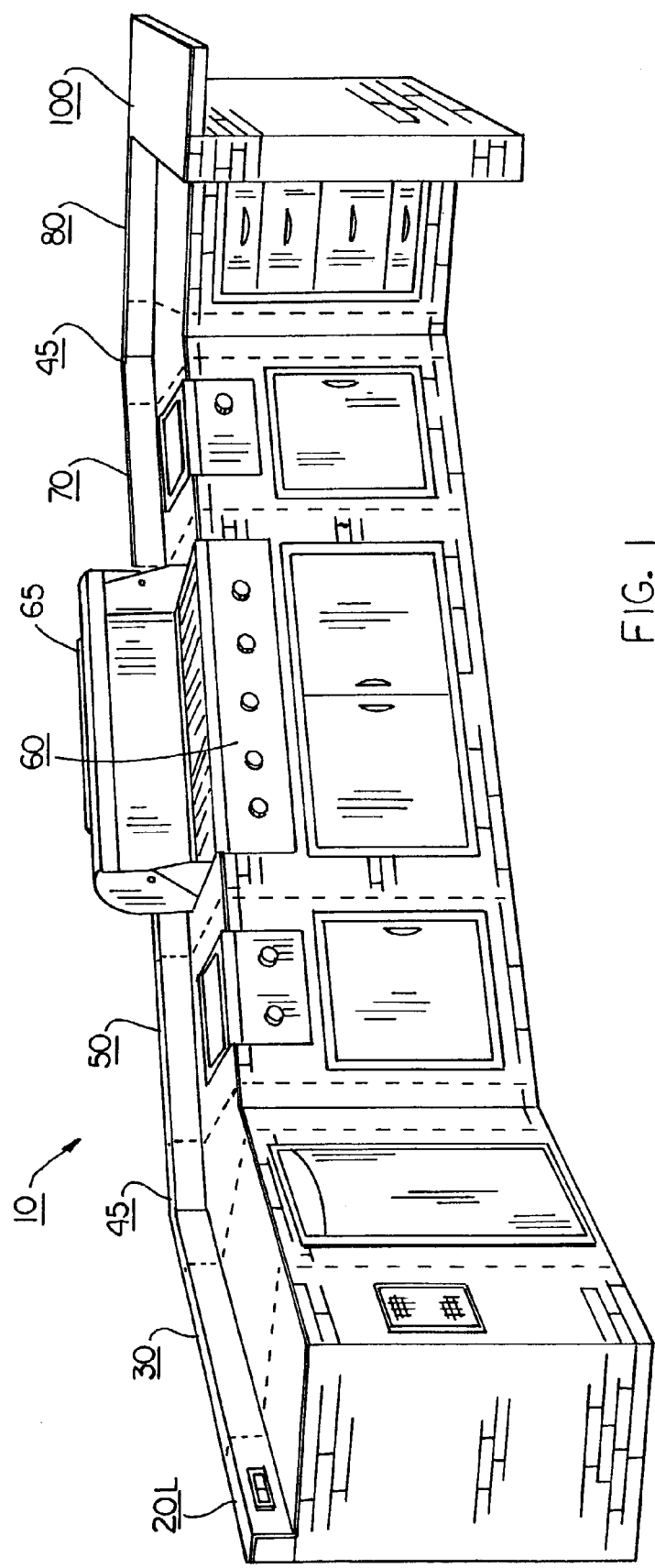
FIG. 1 is a perspective view of one embodiment of a modular outdoor kitchen.

FIG. 1 shows an embodiment of a modular outdoor kitchen 10 according to the invention. The outdoor kitchen 10 includes a plurality of individual portable outdoor kitchen modules 20L, 30, 45, 50, 60, 70, 80, and 100 connected together in a desired arrangement. The dashed lines in FIG. 1 indicate vertical seams between adjoining modules. In the illustrated embodiment, the kitchen 10 includes a left end module 20L, a refrigerator module 30, a first forty-five degree corner module 45, a first side burner module 50, a burner module 60 having multiple burners and a hood 65, a second side burner module 70, a second forty-five degree corner module 45, a drawer module 80, and a bar counter module 100. The connected modules 20L, 30, 45, 50, 60, 70, 80, and 100 combine to form an outdoor kitchen that substantially has the appearance of a custom-built unit that is permanently constructed of an outdoor building material such as brick masonry, stone, stucco, tile, wood, or the like. The modules are substantially interchangeable, and it is possible to directly connect any module to any other module or modules. Accordingly, the modular outdoor kitchen 10 is not limited to the arrangement shown in FIG. 1. The outdoor kitchen 10 may include more or fewer modules than those shown. In addition, it is possible to eliminate unwanted modules and to include other desired modules. An unlimited number of outdoor kitchen arrangements are possible using the disclosed outdoor kitchen system.

Figure 2:
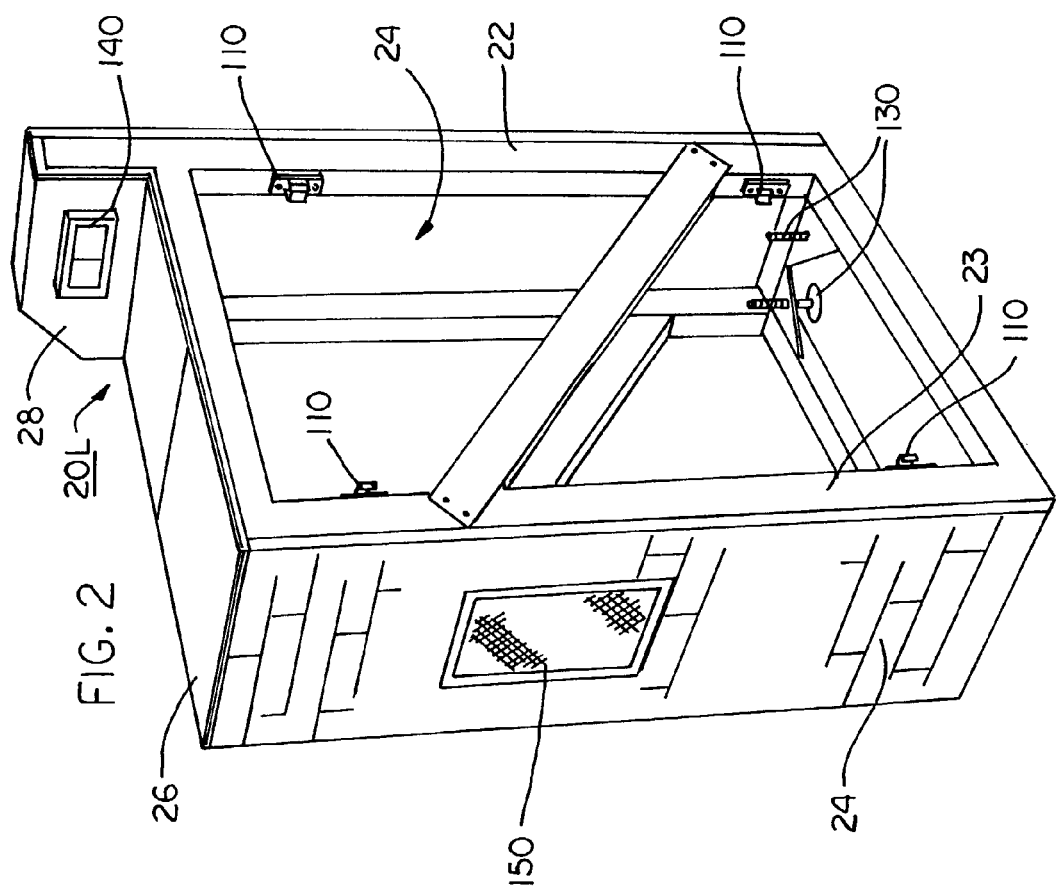
FIG. 2 is a perspective view of an end module for an outdoor kitchen like that shown in FIG. 1.

FIG. 2 shows a typical construction of an outdoor kitchen module. The specific module shown in FIG. 2 is a right end module 20L. The basic construction of each different type of module described herein may be substantially similar to the construction of the left end module 20L. An inner frame 22 defines the overall shape of the module and provides strength and rigidity. The frame 22 includes a plurality of elongated frame members 23, and forms a substantially open interior. Preferably, the frame members 23 are steel, aluminum, or another suitable metal or material, and have suitable structural cross-sections that provide high strength-to-weight ratios. Fasteners, welds, or other suitable connectors join the frame members 23 together. Vertically adjustable levelers 130 are affixed to a base portion of the frame 22. Preferably a leveler 130 includes a threaded shaft having a foot or pad attached to its lower end. The levelers 130 permit the module 20L to stably sit in a level position atop an inclined or otherwise irregular support surface.

One or more weather-resistant outer fascia panels 24 are affixed to outer faces of the frame 22. The outermost surfaces of the fascia panels 24 preferably are textured, colored, and/or contoured to have the appearance of a surface of an outdoor building material such as brick, stone, stucco, tile, wood, or the like. The end module 20L shown in FIG. 2 includes a countertop surface 26. Preferably, the countertop 26 is approximately 36.5 inches tall. Matching modules may also include a backsplash portion 28 as shown having a height of about 42 inches.

All outer surfaces of the modules preferably are constructed of substantially weather-resistant materials, including the outer fascia panels 24, countertop 26, and backsplash 28. For example, the countertop 26 and backsplash 28 may be covered with ceramic or stone tiles or any other material that is suitable as a food-preparation surface and is also weather resistant. The fascia panels 24 preferably are substantially constructed of a fiber cement material such as is available from Nichiha USA, Inc. of Atlanta, Ga. Fiber cement is durable and weather resistant, and can be patterned and colored to provide a realistic resemblance to brick, stone, stucco, or other outdoor building materials.

Figure 3:
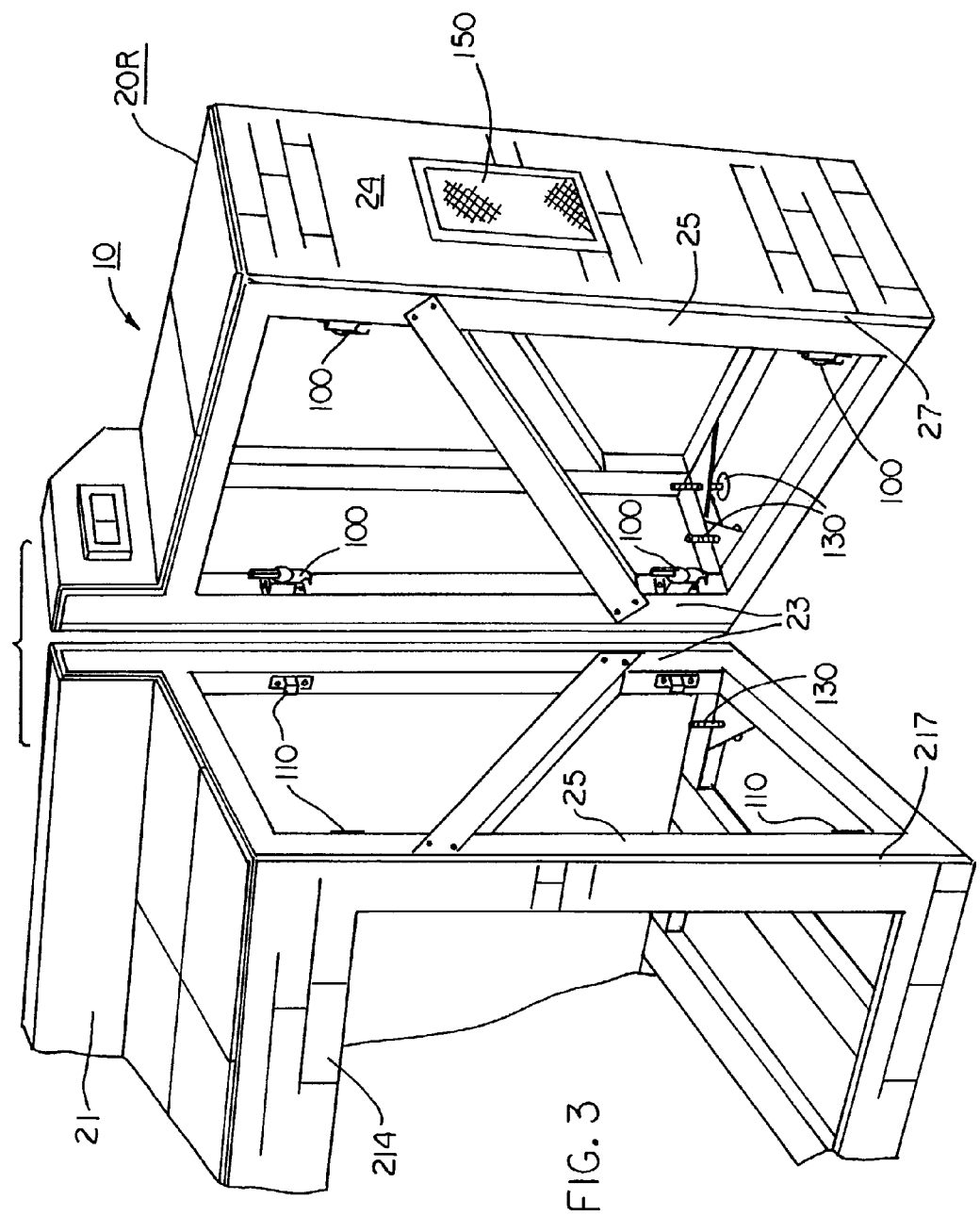
FIG. 3 is a perspective view of the end module of FIG. 2 and an adjacent connecting outdoor kitchen module.

FIG. 3 shows the adjoining sides or ends of a right end module 20R and an adjacent module 21. The adjacent module 21 can be any desired module such as those described in detail below. As shown, the abutting sides or ends of the modules 20R, 21 are substantially open. The corresponding vertical frame members 23, 25 of the adjoining modules substantially abut each other when the modules are connected together. The forward edges 27, 217 of the modules 20R, 21 align with each other such that the fascia panels 24, 214 are substantially coplanar, thus providing an appearance of a continuous surface. The modules 20R, 21 preferably are releasably connected together by aligned connectors 100, 101. In a preferred arrangement, the connectors comprise a rotatable latch portion 100 on one module 20R, and a mating catch portion 110 on the adjoining module 21. When the modules are positioned together in side-by-side arrangement, the rotatable latch 100 is rotated such that the latch 100 engages the catch 110, thereby forming a releasable and secure connection between the modules. Preferably, two latch/catch sets (100/110) are provided at each front and rear vertical joint. One set is provided near the upper ends of each vertical frame members 23, 25, and a second set is located near the bottom end of each vertical frame members 23, 25.

A variety of outdoor kitchen modules is provided such that desired modules can be selected and assembled together to form a customized outdoor kitchen "island." FIGS. 4-13 show several embodiments of various types of modules that can be provided. The modules have compatible overall depths and heights such that when joined together, they mate by combining to form an outdoor kitchen substantially having the appearance of a single unit. The term "mate" as used herein means to join or fit together. Preferably, the countertops of the modules are about 36.5 inches tall, and the depths of all modules (other than the corner modules) are about 28 inches. The backsplash portions of the modules (if any) preferably are about 42 inches tall. In FIGS. 4-13, the interior portions of the modules, including the inner frames of the modules, have been omitted from the Figures. Each substantially open side of these modules is depicted in these Figures by a pair of crossing lines that form an "X". The interior portions of the modules of FIGS. 4-13 are substantially similar to the interior portion of the end unit module 20R shown in FIG. 2. The inner frames of the modules may include one or more cross-brace members for added strength and rigidity. It will be apparent to a person of ordinary skill in the art that other types and sizes of modules other than those shown in the Figures can be provided without departing from the invention.

Figure 5:
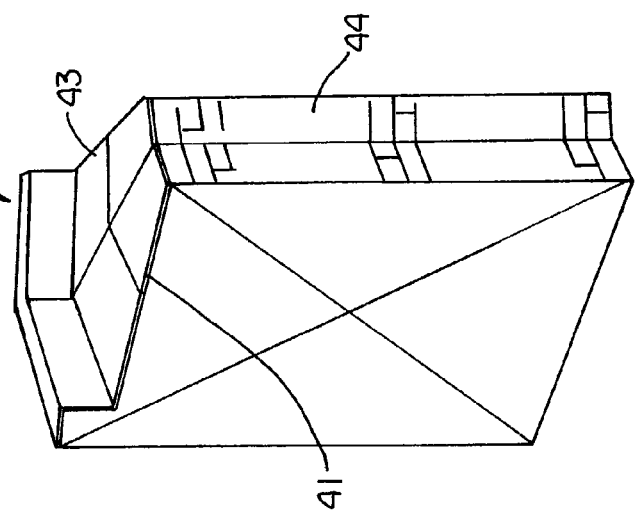
FIG. 5 is a perspective view of a forty-five degree corner module.
Figure 4:
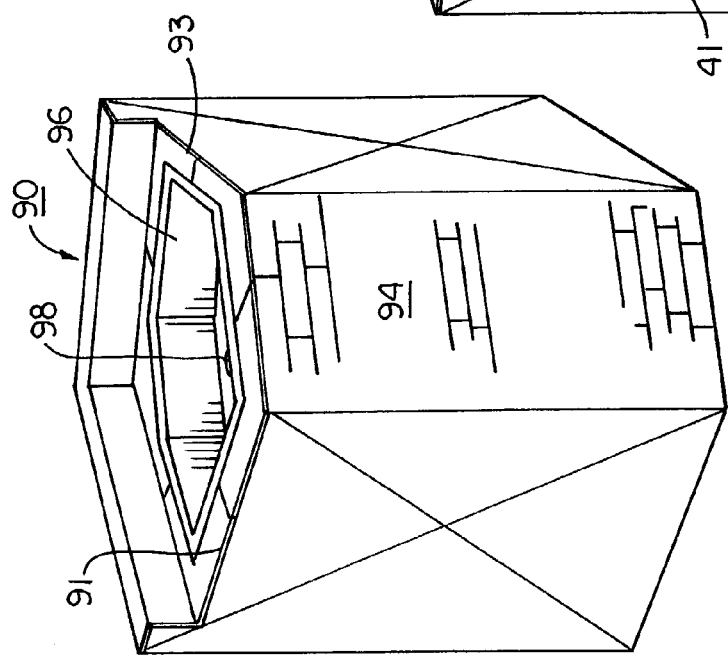
FIG. 4 is a perspective view of a ninety-degree corner module.

FIGS. 4 and 5 show two embodiments of corner modules 90, 45. The corner module 90 shown in FIG. 4 can be included in an outdoor kitchen to form a ninety-degree bend. As shown, side edges 91 and 93 are substantially perpendicular to each other. The exposed front vertical surface includes an outer fascia panel 94 that simulates the appearance of an outdoor building material. A similar matching fascia panel is provided on the exposed rear surface of the module 90 (not shown). The corner unit 90 may include a basin 96 mounted in its top surface as shown. The basin 96 may include a drain 98, and can be used as a sink, ice chest, storage bin, or the like.

The corner unit shown in FIG. 5 provides a bend in an outdoor kitchen that is less than ninety degrees. In the illustrated embodiment, side edges 41 and 43 form an included angle of about forty-five degrees. Other corner units that provide other smaller or larger bend angles can also be provided. For example, corner units forming an included angle of about thirty degrees or about sixty degrees may be provided. The exposed front vertical surfaces of the corner module 45 include an outer fascia panel 44 that simulates the appearance of an outdoor building material. A similar matching fascia panel may be provided on the exposed rear surface of the module 45 (not shown).

Figure 6:
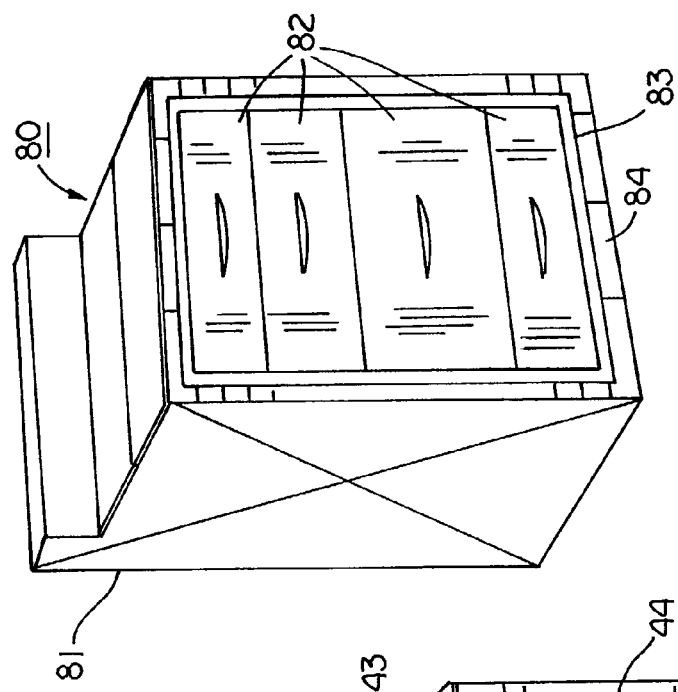
FIG. 6 is a perspective view of an outdoor kitchen module having a plurality of drawers.

FIG. 6 shows an embodiment of a module 80 that includes a plurality of drawers 82. The module 80 includes a housing 81 having an opening 83 for receiving drawers 82. The drawers 82 are slidably mounted in the opening 83. A front fascia panel 84 covers the exposed surfaces of the module 80 around the faces of the drawers 82. A similar matching fascia panel is provided on the exposed rear surface of the module 80 (not shown). The drawers 82 and the housing 81 can be separately packaged and separately transported to an outdoor kitchen site, thereby reducing the individual shipping weights of the packaged components.

FIGS. 7 and 8 show two embodiments of modules having gas burners 72, 62 mounted in their tops. The modules 70, 60 include respective housings 71, 61 having respective recesses 73, 63 that are configured to receive burner units 72, 62. These burner modules 70, 60 may include a single gas burner 72 (as shown in FIG. 7), or two or more gas burners 62 (as shown in FIG. 8). A grille, griddle, or stovetop surface or surfaces may be provided with the burners to permit a variety of cooking method options in an outdoor kitchen (not shown). Where a grilling surface is provided, a movable grilling hood 65 may be provided as shown in FIG. 1. The grill may also include a rotisserie (not shown). A cabinet 76, 66 may be provided in the modules 70, 60 below the burners 72, 62 as shown. The cabinets 76, 66 are received in openings 77, 67 in the housings 71, 61. A single access door 78 may be provided to cover the cabinet 76 in narrower modules 70. Alternatively, two or more access doors 68 may be provided in wider modules 60. The cabinets 76, 66 may be used to house canisters or cylinders for supplying fuel to the gas burners 72, 62, and/or the compartments 76, 66 may be used to store other articles. Front fascia panels 74, 64 cover the exposed front surfaces of the modules 70, 60. Similar fascia panels cover the exposed rear surfaces of the modules 70, 60 (not shown).

A refrigerator module 30 is shown in FIG. 9. The module 30 may include a housing 31 having an opening 33 configured to receive a refrigerator 32. As the modules described above, the module 30 includes a fascia panel 34 that covers the exposed front surfaces of the module. An additional fascia panel may cover the exposed rear surface of the module 30 (not shown). A refrigerator 32 that is suitable for outdoor use is housed in the module 30 as shown. Preferably, the refrigerator unit 32 can be removed from the module 30 for service or replacement. In addition, the refrigerator unit 32 and the housing 31 can be separately packaged and separately transported to an outdoor kitchen site, thereby reducing the individual shipping weights of the packaged components.

A propane canister or trash module 160 is shown in FIG. 10. The module 160 includes a housing 161 having an opening 163. The opening 163 is configured to receive a pair of drawers 162, 166 that are slidably disposed in the opening 163. Preferably, the lower drawer 166 is tall enough to receive a standard propane canister for supplying gas to a burner in an adjacent burner module or other gas appliance. Drawer 166 may include one or more vents 167 to permit any accumulated gas or vapors to escape from the module 160. The drawer 166 can also be used as a trash receptacle. The module includes a front fascia panel 164 that covers the exposed portions of the front face of the module 160 surrounding the drawers 162, 166. An additional fascia panel covers the exposed rear surface of the module 160 (not shown). The drawers 162, 166 can be removed from the housing 161 for separate shipment to reduce the individual shipping weights of the packaged components.

Left and right end cap modules 20L, 20R are respectively shown in FIGS. 11 and 12. The end cap modules 20L, 20R include front fascia panels 24 and end fascia panels 21. The exposed rear surfaces of the modules 20L, 20R also include matching fascia panels (not shown). The end cap modules 20L, 20R may include speakers 150 mounted on their fascia panels 21, 24. Speakers 150 similarly may be provided on any of the other modules described herein. The modules 20L, 20R may also include one or more electrical outlets 140 mounted on their backsplashes 28 or elsewhere on the modules. Outlets 140 similarly may be provided on any of the other modules described herein. In FIGS. 11 and 12, the outlets 140 are conveniently located on the backsplashes 28 such that the outlets 140 are proximate to the countertops 26.

Figure 13:
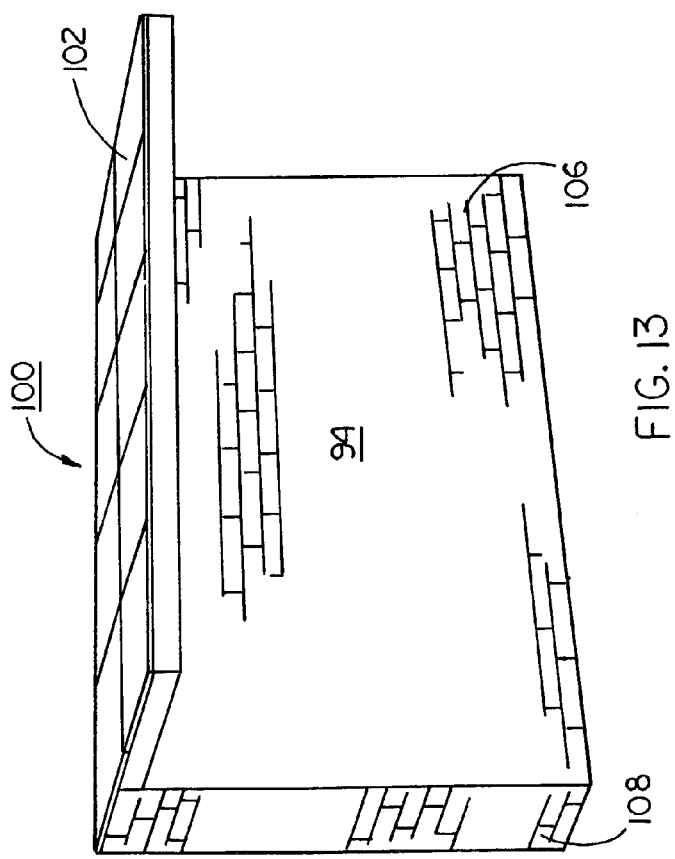
FIG. 13 is a perspective view of a bar counter module.

A bar or counter module 100 is shown in FIG. 13. The bar module 100 includes a counter portion 102 and a riser or wall portion 106. The riser portion 106 includes a front fascia panel 104 and an end fascia panel 108 on each end. The exposed rear surface of the riser portion 106 also includes a matching fascia panel (not shown). One or more ends of the bar module, such as 100, may be configured for attachment to an end of an adjacent module as shown in FIG. 1.

Figure 14:
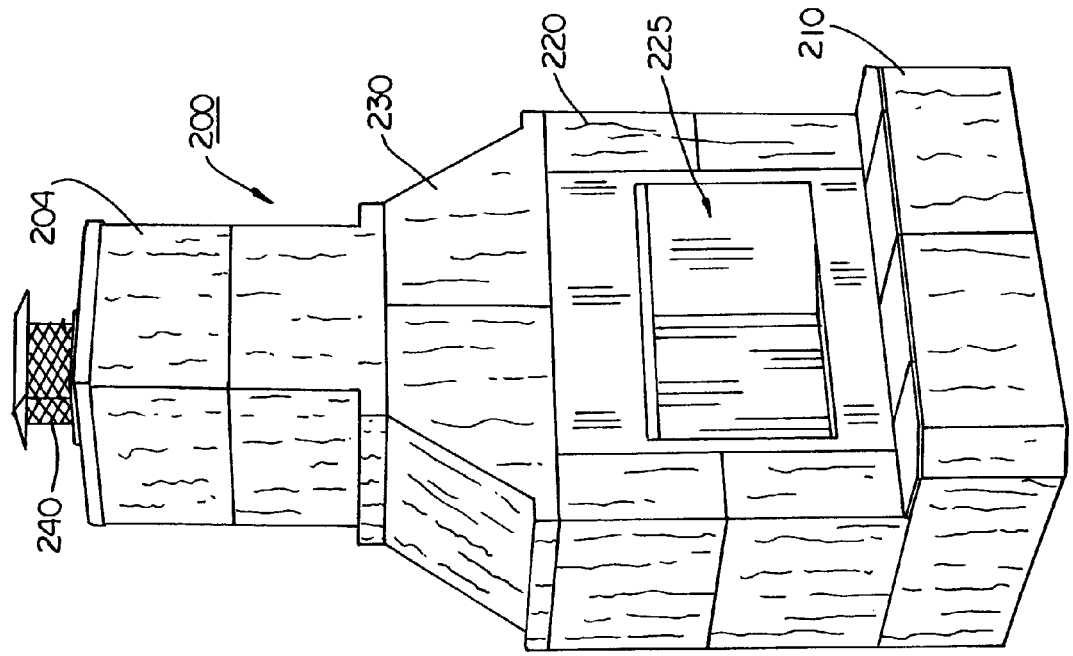
FIG. 14 is a perspective view of an assembled modular outdoor fireplace.
Figure 15:
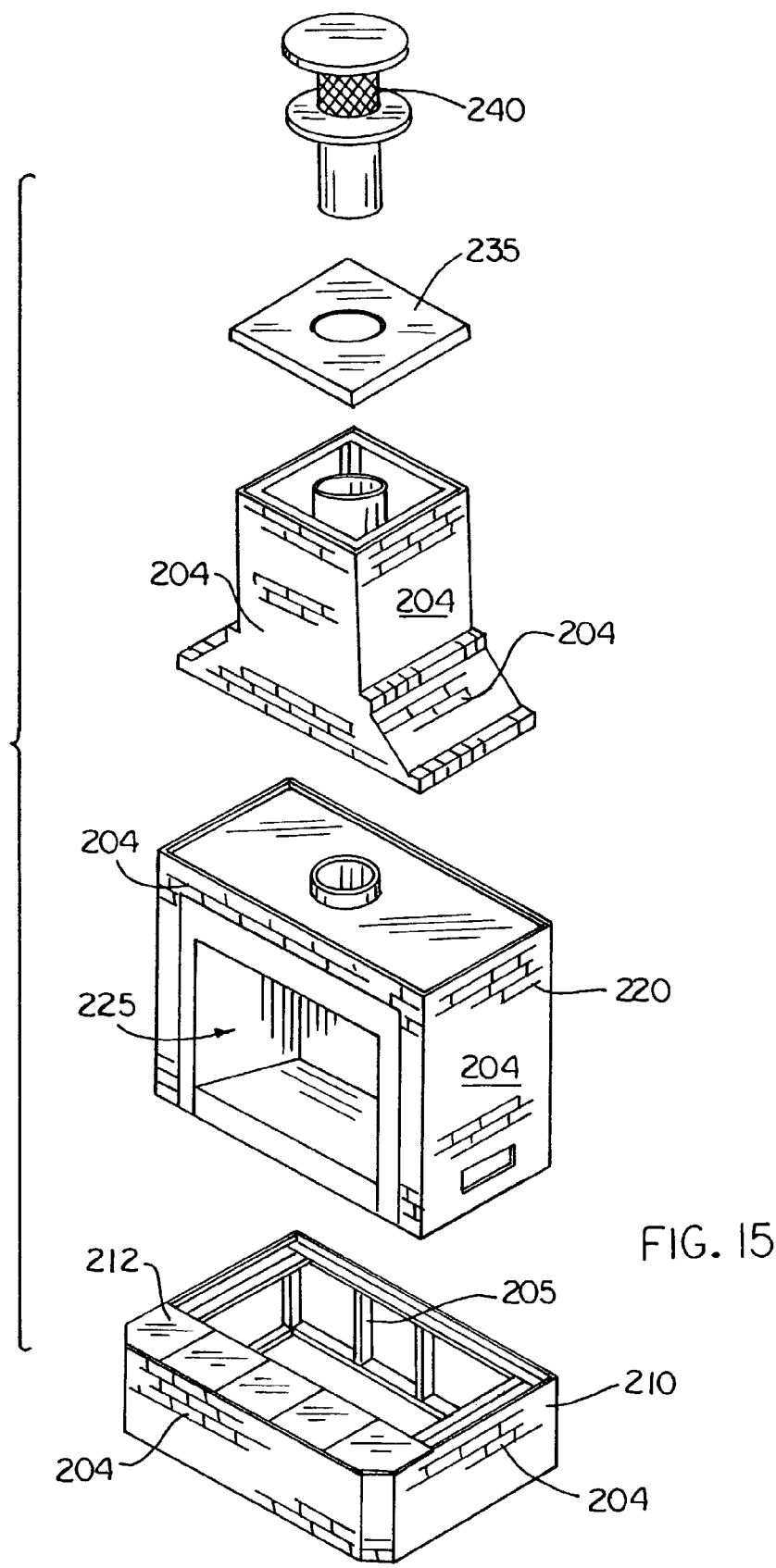
FIG. 15 is an exploded view of the modular outdoor fireplace shown in FIG. 14.

An outdoor kitchen 10 like that shown in FIG. 1 may further include a matching standalone or attached outdoor fireplace 200 like that shown in FIG. 14. The fireplace 200 includes a plurality of fascia panels 204 that provide the appearance of an outdoor building material such as brick or stone that substantially matches the appearance of the corresponding fascia panels of the outdoor kitchen 10. In the embodiment shown in FIG. 14, the fireplace 200 includes a hearth portion 210, a firebox portion 220 having a fireplace opening 225, a chimney portion 230, and a vent portion 240. As shown in FIG. 15, the fireplace 200 may comprise a plurality of modules 210, 220, 230, 240 that can be produced and shipped separately, and joined together at an outdoor kitchen site. Preferably, the modules 210, 220, 230, 240 are substantially constructed like the various kitchen modules described above, including inner frames 205 and outer fascia panels 204.

A customized outdoor kitchen such as that shown in FIG. 1 is constructed by first selecting desired types and quantities of provided outdoor kitchen modules having substantially matching outer fascia panels. The selected individual modules are transported to an outdoor kitchen site where they are assembled together in a desired configuration. Once joined together and fully assembled, an outdoor kitchen like that shown in FIG. 1 substantially has the appearance of an outdoor kitchen substantially constructed of a permanent outdoor building material such as brick, stone, stucco, tile, wood, or the like. In order to mask the vertical seams between adjacent fascia panels of adjoining modules, a matching filler material may be applied to cover the seams.

Although specific embodiments of the present invention have been illustrated and described in detail, it is to be expressly understood that the invention is not limited thereto. The above detailed description of the embodiment is provided for example only and should not be construed as constituting any limitation of the invention. Thus, modifications will be obvious to those skilled in the art, and all modifications that do not depart from the spirit of the invention are intended to be included within the scope of the appended claims.

What is claimed is:

1. A modular outdoor kitchen comprising:
a first end outdoor kitchen module, a second end outdoor kitchen module and at least two intermediate outdoor kitchen modules, each of said end and intermediate modules comprising a frame comprising a plurality of connected metal members, each frame having a generally open interior and a plurality of generally open outer faces including first and second sides, said frames of said modules configured to be interchangeably connected with one another, permitting said at least two intermediate outdoor kitchen modules to be connected to one another in side-to-side relationship in any order between said first end and second end outdoor kitchen modules, at least one of said intermediate outdoor kitchen modules including at least one burner configured to heat a cooking surface and having a movable grilling hood which may be rotated over the cooking surface and at least one of said modules defining a countertop and a backsplash extending upwardly beyond at least a portion of said countertop;

one or more weather-resistant fiber cement fascia panels, said panels located over said outer faces of said modules except the sides of said modules which abut one another when said modules are connected to generally enclose said outer faces of said modules, said panels including at least one exterior surface that simulates the appearance of an outdoor building material; and one or more mechanical connectors releasably connecting the plurality of modules into a customized unitary assembly, said connectors comprising a plurality of mating pairs of rotatable latches and catches, whereby an outer portion of said customized unitary assembly has the appearance of a built-in outdoor kitchen that is substantially constructed of outdoor building material when the plurality of outdoor kitchen modules are connected together and wherein at least two adjacent modules of said unitary assembly have a similar height and/or depth, whereby one or more of said outer portions of said unitary assembly spanning two or more of said modules are generally planar and contiguous.

2. A modular outdoor kitchen according to claim 1 wherein each module has a maximum height, width, or depth that is less than or equal to about 63 inches.

3. A modular outdoor kitchen according to claim 1 wherein each module has a total weight that is less than or equal to about 320 pounds.

4. A modular outdoor kitchen according to claim 1 wherein said one or more fiber cement panels have an exterior configured to resemble brick, stone, stucco, tile, or wood.

5. A modular outdoor kitchen according to claim 1 wherein at least one of the modules comprises an apparatus selected from a group consisting of a refrigerator, a basin, and a sink.

6. A modular outdoor kitchen according to claim 1 wherein at least one of the modules comprises a storage compartment.

7. A modular outdoor kitchen according to claim 1 wherein at least one of the end modules is a bar module having a counter portion.

8. A modular outdoor kitchen according to claim 1 wherein the frame of each module includes a base portion and a plurality of adjustable levelers affixed to the base portion.

9. A modular outdoor kitchen according to claim 1 wherein at least one of the modules includes an electrical outlet mounted on the module.

10. A modular outdoor kitchen according to claim 1 wherein at least one of the modules includes a speaker affixed to the module.

11. A modular outdoor kitchen according to claim 1 wherein at least one of said end or intermediate modules comprises a fireplace having a substantially matching exterior surface that simulates the appearance of the outdoor building material.

12. A modular outdoor kitchen according to claim 11 wherein the free-standing fireplace comprises: (a) a hearth portion; (b) a firebox portion; and (c) a chimney portion; (d) wherein the hearth, firebox, and chimney portions are configured to be releasably connected together.

13. A modular outdoor kitchen according to claim 1 wherein said modules are connected in a non-linear combination.

14. The modular outdoor kitchen according to claim 1 comprising at least three intermediate outdoor kitchen modules which may be interchangeably connected in any order between said first and second end outdoor kitchen modules.

15. The modular outdoor kitchen according to claim 1 wherein after assembly said open first and second sides of said intermediate outdoor kitchen modules are generally closed by connection to another module, said first end outdoor kitchen module has a first side closed by said one or more fascia panels and a second side generally closed by connection to a first one of said intermediate outdoor kitchen modules and said second end outdoor kitchen module has a first side closed by said one or more fascia panels and a second side generally closed by connection to a second one of said intermediate outdoor kitchen modules.

16. The modular outdoor kitchen in according to claim 15 wherein each of said end and intermediate modules has a front and a back and at least one fascia panel generally closes said front and back thereof.

* * * * *